United States Patent [19]

Patel et al.

[11] Patent Number: 5,313,587
[45] Date of Patent: May 17, 1994

[54] DEVICE FOR SIMULTANEOUS DATA INPUT/OUTPUT AND EXECUTION SUPPORT IN DIGITAL PROCESSORS

[75] Inventors: Chandravadan N. Patel, Los Altos; Richard W. Blasco, Auburn; Kenneth M. Chan, Saratoga; Shieh C. Chen, Palo Alto, all of Calif.

[73] Assignee: Hitachi Micro Systems, Inc., San Jose, Calif.

[21] Appl. No.: 852,356

[22] Filed: Mar. 17, 1992

Related U.S. Application Data

[63] Continuation of Ser. No. 354,342, May 19, 1989, abandoned.

[51] Int. Cl.$^5$ .............................................. G06F 13/38
[52] U.S. Cl. ................................... 395/275; 395/800; 364/DIG. 1; 364/240.2; 364/242.3
[58] Field of Search .................. 395/275, 200, 800

[56] References Cited

U.S. PATENT DOCUMENTS

| | | | |
|---|---|---|---|
| 3,390,379 | 6/1968 | Carlson et al. | 364/200 |
| 4,103,328 | 7/1978 | Dalmasso | 364/200 |
| 4,371,932 | 2/1983 | Dinwiddie, Jr. et al. | 395/275 |
| 4,385,382 | 5/1983 | Goss et al. | 370/96 |
| 4,447,873 | 5/1984 | Price et al. | 364/200 |
| 4,471,456 | 9/1984 | Branigin et al. | 364/900 |
| 4,476,526 | 10/1984 | Dodd | 364/200 |
| 4,479,179 | 10/1984 | Dinwiddie, Jr. | 395/275 |
| 4,484,263 | 11/1984 | Olson et al. | 364/200 |
| 4,523,310 | 6/1985 | Brown et al. | 370/112 |
| 4,571,671 | 2/1986 | Burns et al. | 364/200 |
| 4,604,683 | 8/1986 | Russ et al. | 364/200 |
| 4,751,634 | 6/1988 | Burrus, Jr. et al. | 364/200 |
| 4,825,357 | 4/1989 | Ovies et al. | 364/200 |
| 4,912,632 | 3/1990 | Gach et al. | 364/200 |
| 4,972,368 | 11/1990 | O'Brien et al. | 364/900 |

OTHER PUBLICATIONS

Snively, Robert, "Intelligent Host Adapter Directs I/O Traffic, Freeing Up Host Processor," Electronic Design, Sep. 20, 1984, pp. 243-246, 248, 250 and 252.

*Primary Examiner*—Robert B. Harrell
*Assistant Examiner*—Richard Lee Ellis
*Attorney, Agent, or Firm*—Flehr, Hohbach, Test, Albritton & Herbert

[57] ABSTRACT

A device for simultaneous data input and output and program execution support in digital processors is disclosed. The device includes a plurality of controllable input and output ports for inputting and outputting data from the device, a data cache memory which is selectively couplable to each of the plurality of input and output ports, and a controller for controlling the plurality of input and output ports and the data cache memory. The connectivity and controlablity provided by the present invention effectuates a transfer of data between any of the plurality of input and output ports or the data cache memory. The device provides multiport high-speed and high-throughput non-multiplexed data input and output while maintaining the speed and throughput characteristics of the digital processor because the input/output data transfer takes place simultaneously with digital processor program execution. The processor need not wait for data transfers from external data sources when this device is used. The non-multiplexed multiport configuration further allows data sources of different types, such as serial, parallel, and direct memory access, to be simultaneously connected to the device.

17 Claims, 3 Drawing Sheets

DEVICE FOR SIMULTANEOUS DATA INPUT/OUTPUT AND EXECUTION SUPPORT IN DIGITAL PROCESSORS

This is a continuation of application Ser. No. 07/354,342 filed on May 19, 1989.

BACKGROUND OF THE INVENTION

1. Field of the Invention

The present invention relates to a device for data input and output and particularly to devices for data input and output which have multiple ports and are utilized in digital signal processing.

2. Prior Art

In the prior art there exist devices for data input and output which support digital processors; however, such prior art devices are generally single port devices. As a result, only one data source may be connected to the device and this presents a disadvantage. To overcome this disadvantage, the single port of prior art devices is multiplexed between a plurality of data sources; however, while such devices with multiplexing do provide for the connection of more than one data source to the device, they have an additional disadvantage in that they are slow.

Furthermore, since such multiplexed devices for data input and output still essentially use a single port, all of the data sources connected to the device must have the same characteristics or be of the same type. In other words, data sources which present serial data, parallel data or direct memory access may not be connected together to the same single port multiplexed data input and output device.

Also, prior art data input and output devices generally provide sequential operation. In particular, they either input or output, then process and then either input and output again. Processing in parallel with either input or output is not possible. As a result of this sequential operation of prior art devices, the throughput of such devices is inhibited and causes the processors which are connected to such prior art data input and output devices to wait and be slow.

SUMMARY OF THE INVENTION

Accordingly, it is a primary objective of the present invention to provide a device for data input and output which supports digital processors and overcomes the disadvantages of the prior art.

It is a specific objective of the present invention to provide a device for data input and output wherein the device is provided with a plurality of ports and the ports are compatible with different types of data sources.

It is another objective of the present invention to provide a device for data input and output wherein the data input and output occurs simultaneously with the operation of the digital processor which the device supports.

It is still another objective of the present invention to provide a device for data input and output wherein the input and output is in parallel with the processing of the digital processor.

It is yet another objective of the present invention to provide a device for data input and output which is high in speed and has a high through-put.

In keeping with the principles of the present invention, the objectives of the present invention are accomplished by a unique device for simultaneous data input and output and execution support in digital processors. The device includes a plurality of input and output interfaces for providing a plurality of controllable input and output ports. The controllable input and output ports are for inputting and outputting data from the device. Each of the plurality of input and output interfaces is individually controllable and operable without external control signals. The device further includes a data cache memory which is selectively couplable to each of the plurality of input and output interfaces for either receiving data from or outputting data to any one of the plurality of input and output interfaces.

In addition, the device of the present invention includes a means for controlling the plurality of input and output interfaces and the data cache memory for effecting a transfer of data between any of the plurality of input and output ports or the data cache memory.

By use of this device, data transfer can be effected simultaneously with program execution in a digital processor which the device supports.

BRIEF DESCRIPTION OF THE DRAWINGS

The above mentioned features and objects of the present invention will become more apparent with reference to the following description taken in conjunction with the drawings wherein like reference numerals denote like elements and in which.

DETAILED DESCRIPTION OF THE INVENTION

Figure 1:
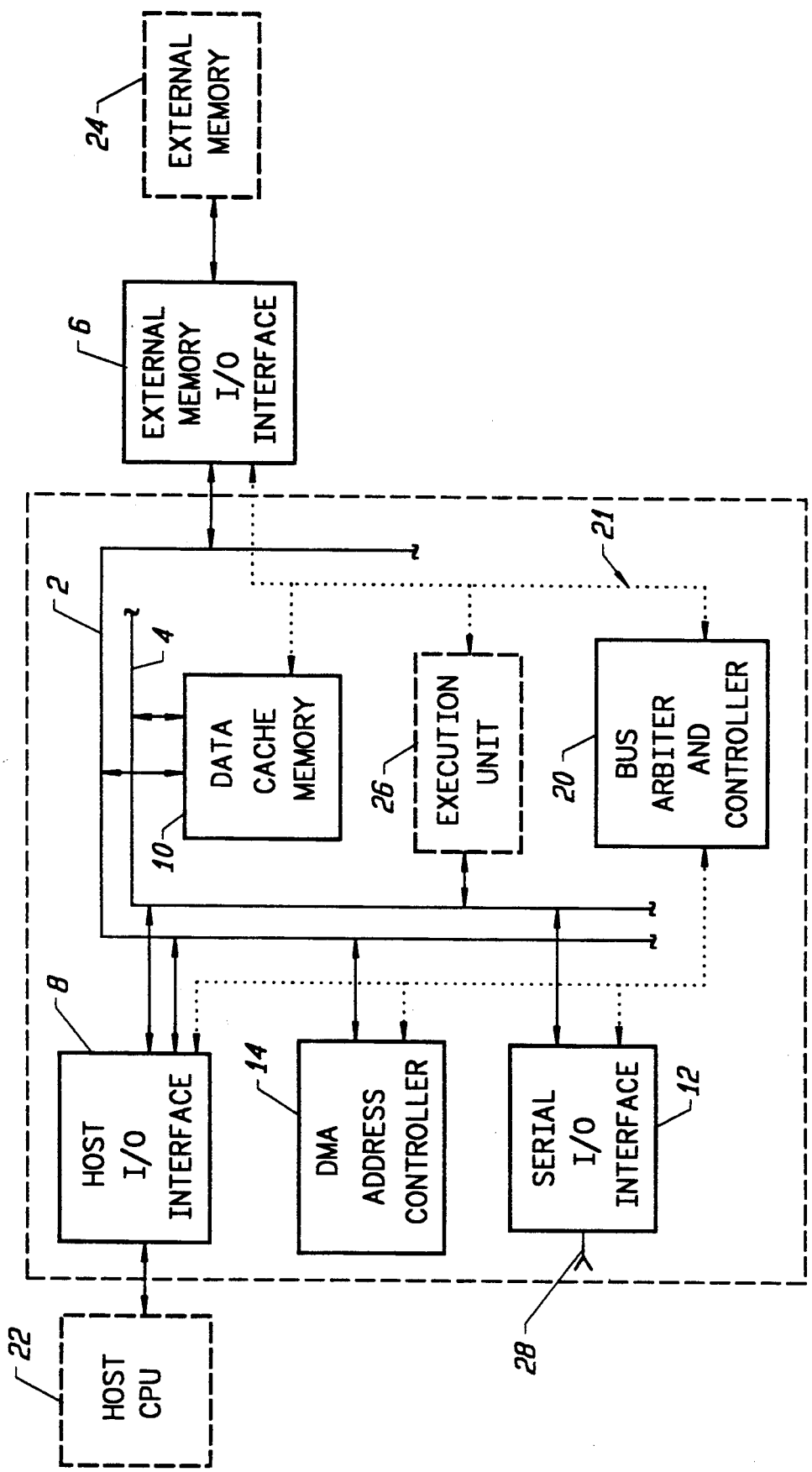
FIG. 1 is a block diagram of a device for simultaneous data input and output and execution support in digital processors in accordance with the teachings of the present invention.

Referring to FIG. 1, shown therein is one embodiment of a device for simultaneous data input and output and execution support in a digital processor, in accordance with the teachings of the present invention. The device includes two buses 2 and 4 which are called for the purposes of explanation, the E bus and the H bus, respectively. To the E bus 2 is coupled an external memory input and output interface 6 and host input and output interface 8. A dual port data cache memory 10 is provided and one port of the data cache memory 10 is connected to the E bus 2 and the other port is connected to the H the host bus 4. As shown in greater detail in FIG. 4, the first port connected to E bus 2 comprises a data line connecting register 44 to page memory 41 and address line 45 connecting multiplexor 56 and pages memory 41. The second port connected to H bus 4 comprises a data line connecting register 43 to page memory 41 and an address line connecting address pointers to page memory 41. The host input and output interface 8 and the serial input and output interface 12 are further connected to the H bus 4. A direct memory access address controller 14 is coupled to the E bus 2.

A bus arbiter and controller 20 is also provided and the bus arbiter and controller 20 is coupled respectively to the respective elements of the device by control lines 21 as indicated by dots in FIG. 1. The bus arbiter and controller 20 controls the transfer of data over the E bus 2 and H bus 4 between the various input and output interfaces or the data cache memory 10 and determines an order of priority of data transfer over the E bus 2 and H bus 4.

Also shown in FIG. 1 are elements in dashed lines which are sources or receivers of data which may be connected to the ports of the device. In particular, a host central processing unit 22 may be connected to the host input and output interface 8, an external memory 24 may be connected to the external memory input and output interface 6 and an execution unit 26 may be connected to the H bus 4. In addition, several different types of serial devices could be connected to the serial input and output interface 12.

In operation, the bus arbiter and controller 20 receives various data transfer requests. These data transfer requests may originate at such locations as the execution unit 26, host input/output interface unit 8, external memory input/output interface unit 6 and serial input/output interface unit 12 and are typically a function of the program flow. Examples of possible data transfers are:

1) from the data cache memory 10 to the external memory 24 or from the external memory 24 to the data cache memory 10;

2) from the host central processing unit 22 to the external memory 24 or from the external memory 24 to the host central processing unit 22;

3) from the host central processing unit 22 to the data cache memory 10 or from the data cache memory 10 to the host central processing unit 22;

4) from the host central processing unit 22 to the serial port 28 or from the serial port 28 to the host central processing unit 22;

5) from the serial port 28 to the execution unit 26 or from the execution unit 26 to the serial port 28;

6) from the data cache memory 10 to the execution unit 26 or from the execution unit 26 to the data cache memory 10; and 7) a Z delay (to be explained in conjunction with the data cache memory 10 below).

Of the above data transfer operations, at least 1), 2), 6) and 7) may be done simultaneously with program execution.

The bus arbiter and controller 20 controls the various input and output interfaces 6, 8 and 12 and the data cache memory 10 in order to effect the above-described data transfers; however, more than one data transfer request may received at the same time. As a result, the bus arbiter and controller 20 is provided with a means for prioritizing data transfer requests and based upon this priority scheme determines which of the plurality of data transfer requests will be first, second, third, etc. Generally, the order of priority may be the same as the order of data transfer requests set forth above.

In addition to the input and output interfaces 6, 8 and 12 and the data cache memory 10, the device further includes a direct memory access address controller 14. The direct memory access address controller 14 is for the purpose of providing direct memory access for the device and typically for providing direct memory access between the host central processor unit 22 or the execution unit 26 and the external memory 24.

It should be apparent to those skilled in the art that the various input and output interfaces 6, 8 and 12 are generally similar to prior art interfaces and are at least provided with signal conditioning and impedance matching circuitry and logic gates for effecting the transfer of data into or out of the device in response to control signals from the bus arbiter and controller 20. Furthermore, the data cache memory 10 may be any size which is practical and might typically consist of a memory capable of handling 256 words wherein each word is composed of 16 bits. Also the data cache memory 10 might be paged and could consist of any where from two to four pages.

It should be further apparent to one skilled in the art that the present invention is not limited by the number of buses shown in FIG. 1 or the possible data transfer operations described above and it would be possible to design a device within the teachings of the present invention which has fewer or more buses and wherein other or a greater number of data transfer operations would be possible. Furthermore, the execution unit could include an arithmetic logic unit.

Figure 2:
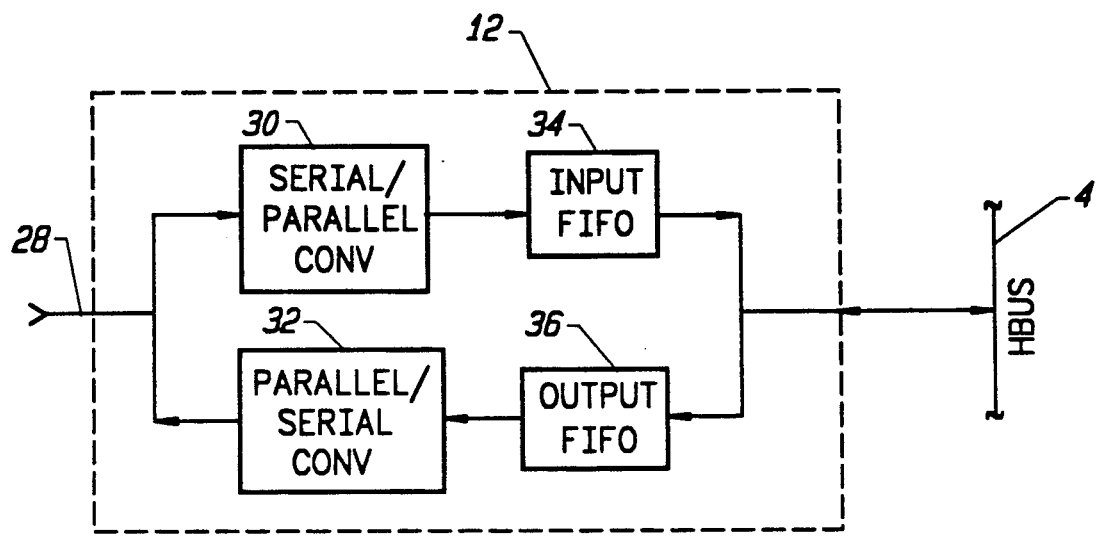
FIG. 2 is a block diagram of the serial input and output interface of FIG. 1.

Referring to FIG. 2, shown therein is one embodiment of a serial input and output interface 12. The serial input and output interface 12 includes a serial to parallel convertor 30 and a parallel to serial convertor 32 having their respective inputs and outputs coupled to the serial port 28. The output of the serial to parallel convertor 30 is coupled to the input of a first-in first-out memory (FIFO) 34 and the input of the serial to parallel convertor 32 is coupled to the output of a first-in first-out memory (FIFO) 36. The respective output and input of the input FIFO 34 and output FIFO 36 are coupled to the H bus 4. Both the input FIFO 34 and output FIFO 36 comprise a memory consisting of several words. In other words, both the input FIFO 34 and the output FIFO 36 are capable of handling a plurality of data words at one time. Typically the number of data words would be eight or sixteen and each word would comprise eight bits.

In operation, the serial data applied to the serial port 28 is serial to parallel converted by the convertor 30 and the parallel data is applied to the input FIFO 34. The input FIFO 34 functions as a fall through FIFO and the oldest word contained in the input FIFO 34 is transferred to the H bus 4. Data words from the H bus 4 which are parallel data are applied to the output FIFO 36 which is also a fall through FIFO and the oldest word contained in the output FIFO 36 is applied to the parallel to serial convertor 32 wherein it is converted into serial data and applied to the serial port 28.

Figure 3:
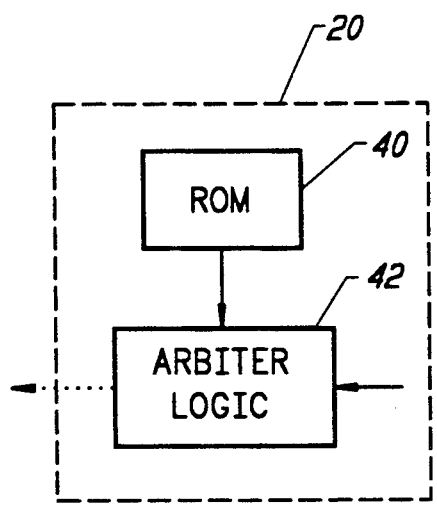
FIG. 3 is a simplified block diagram of the block arbiter and controller of FIG. 1.

Referring to FIG. 3, shown therein is a bus arbiter and controller 20. The bus arbiter and controller 20 includes a read only memory (ROM) 40 coupled to arbiter logic 42. The arbiter logic 42 receives data transfer requests and outputs control signals. In operation, a particular priority of data transfer requests are stored in the ROM 40 and this particular priority of request is utilized by the arbiter logic 42 and is compared with the input data transfer request to determine the priority of data transfer within the device for simultaneous data input and output.

It should also be apparent that the read only memory 40 could be replaced by or supplemented with a random access memory (RAM) and that by way of the RAM, the order of priority of data transfer could be changed, added to, etc. by way of software programming.

Figure 4:
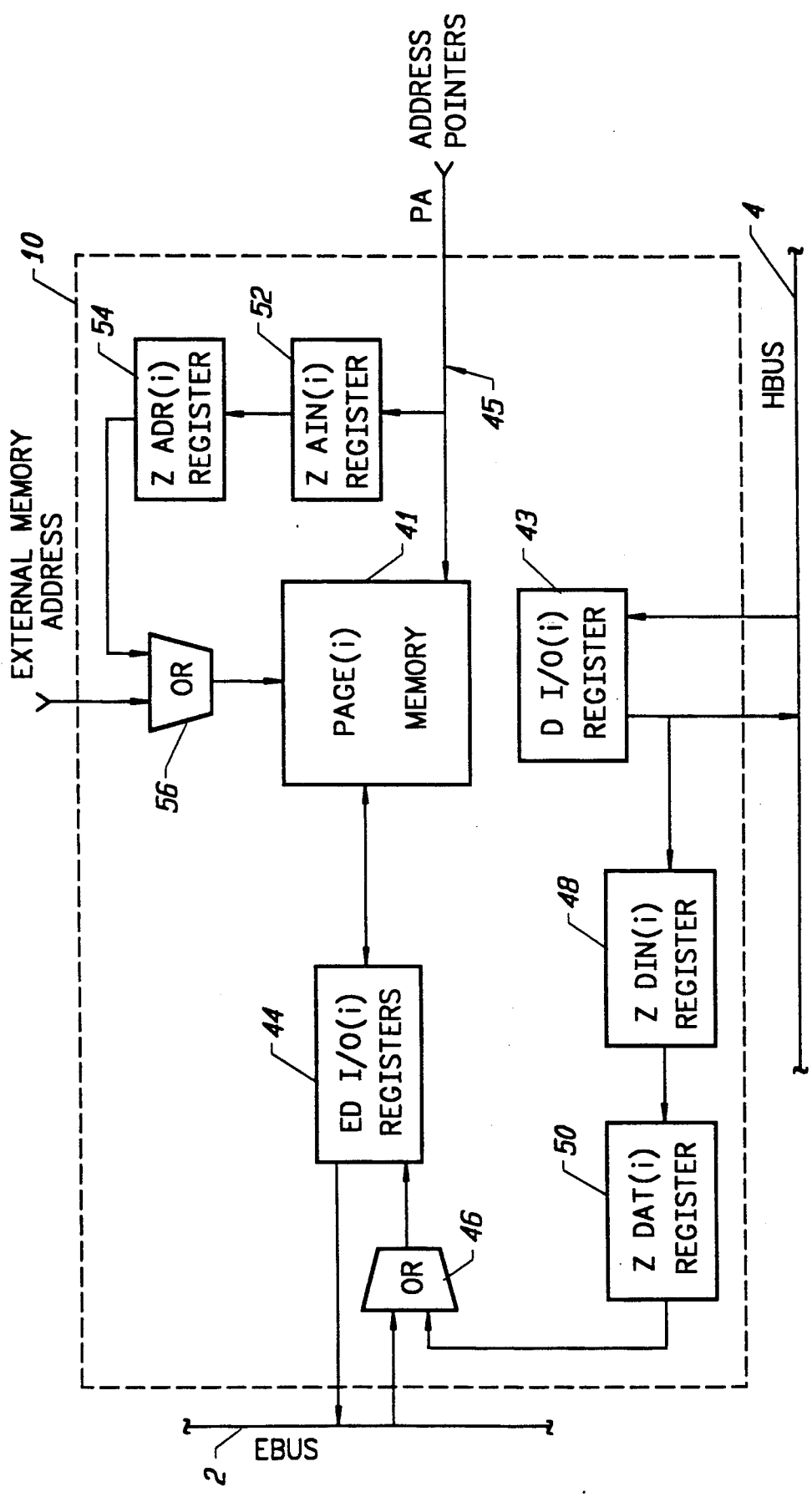
FIG. 4 is a simplified block diagram of the data cache memory of the device of FIG. 1.

Referring to FIG. 4 shown therein is an example of a data cache memory 10 in accordance with the teachings of the present invention. In particular, FIG. 4 shows one page of a data cache memory 10 and the device of the present invention could include more than one page (i) wherein (i)=0, 1, etc.

In particular, the data cache memory 10 comprises a page memory 41 having at least two ports. One of the ports is coupled to data input and output registers 43 and the other port is coupled to external data memory input and output registers 44. The inputs and outputs of data input and output register 43 are coupled to the H bus 4, while the output of the external memory data input and output register 44 is connected to the E bus 2 and the input thereof is connected to the E bus 2 via multiplexer 46. Also the output of data input and output register 43 is connected to Z data in register 48 and the output thereof is connected to Z data register 50. Furthermore, the output of Z data register 50 is connected to one of the inputs of multiplexer 46.

Address pointers PA, generated by a data cache memory controller (not shown), are supplied to the page memory 41 and provide the address pointers for the page memory. A Z address IN register 52 is connected to the address pointers PA and the output thereof is connected to the input of Z address register 54 and the output of the Z address 54 and an address signal from the external memory are supplied to the page memory via an OR gate 56.

In operation, data is inputted and outputted from the page memory 41 to the respective E bus 2 and H bus 4 via the respective external data input and output registers 44 and data input and output registers 43. Furthermore, Z delay may be effected in the following way:

| | |
|---|---|
| INSTRUCTION 1: | PAGE(i) {@PA}→DO(i) |
| INSTRUCTION 2: | DO(i)→H BUS, ZDIN(i) |
| | PA→ZAIN(i) |
| INSTRUCTION 3: | ANY OPERATION |
| | ZDIN(i)→ZDAT(i) |
| | ZAIN(i)→ZADR(i) |
| INSTRUCTION 4: | Z DELAY OPERATION |
| | ZDAT(i)→PAGE(i) {@ZADR(i)} |

From the above description it should be apparent to those skilled in the art that utilizing the present invention one may overcome the disadvantages of the prior art. In particular, data transfer operations may occur simultaneously with program execution utilizing the device of the present invention.

It should be apparent to those skilled in the art that the above described embodiments are merely illustrative of but a few of the many embodiments which may encompass the scope of the present invention and that numerous and other various embodiments may readily devised with departing from the spirit and scope of the present invention.

We claim:

1. A device for simultaneous data input and output and execution support in digital precursors, wherein said execution support includes program execution support for directly transferring data between an external device and an execution unit of a digital processor and Z delay execution support, said device comprising:
   a plurality of input/output interfaces for providing a plurality of controllable input/output ports for inputting and outputting data, each of said plurality of input/output interfaces being individually controllable and operable without control signals from sources external to said device, said plurality of input/output interfaces including a interface to said execution unit of said digital processor for direct program execution support;
   a plurality of internal busses;
   a data cache memory selectively couplable to each of said plurality of input/output interfaces including said interface to said digital processor execution unit via at least one of said plurality of said busses, said data cache memory further comprising:
      at least two ports, a first one of said ports being employed for only said data input and output, and a second one of said ports being employed for both said data input and output and said execution support;
      a means for storing data;
      a means for storing addresses;
      a first address means for inputting addresses into said first port of said data cache memory or said means for storing addresses from a first source of address pointers;
      a second address means for inputting addresses into said second port of said data cache memory from said means for storing addresses or a source of external memory addresses;
      one of said busses comprising a first means for inputting and outputting data from said first port of said data cache memory; and
      another of said busses comprising a second means for inputting and outputting data from said second port of said data cache memory;
      and a means for controlling said plurality of input/output interfaces and said data cache memory for effecting a transfer of said data between any of said plurality of input/output devices or said data cache memory attached to a first of said plurality of internal busses while simultaneously effecting a transfer between any other of said plurality of input/output devices or said data cache memory which are attached to a second of said plurality of internal busses;
      whereby data transfer is via at least one of said plurality of internal busses and is able to be effected simultaneously with program execution in a digital processor.

2. A device for simultaneous data input and output and execution support in digital processors according to claim 1, wherein said plurality of data input/output interfaces are selected from the group consisting of host central processing unit input and output interfaces, serial input and output interfaces, external memory input and output interfaces and parallel data input and output interfaces.

3. A device for simultaneous data input and output and execution support in digital processors as recited in claim 1 wherein said means for storing data further comprises:
   a first data storage means for storing said data at an address defined by said first or second address means;
   a second data storage means for storing data outputted from said first means for inputting and outputting data;
   a third data storage means for storing said data from said second data storage means, an output of said third data storage means being a first selectable input to said second port of said data cache memory;
   whereby said storage of data from said second data storage means constitutes an intermediate step in said Z delay execution support, the first step including said storage of data outputted from said first means for inputting and outputting data, and the final step including selection of said output from said third data storage means for writing to said second port of the data cache memory, where said writing can be simultaneous with said data input and output at said first port of the data cache memory.

4. A means for storing data as recited in claim 3 wherein said second means for inputting and outputting data comprises a second selectable input to said second port of the data cache memory, said second selectable input being utilized during said data input and output, and said first selectable input being utilized during said Z delay execution support.

5. A device for simultaneous data input and output and execution support in digital processors as recited in claim 1 wherein said means for storing addresses further comprises:
   a first address storage means for storing said address pointers;
   a second address storage means coupled to said first address storage means for storing said addresses from said first address storage means;
   said first and second address storage means cooperating to retain during the process of said Z delay execution support the address of data operated on as part of said Z delay execution support, the final step of said Z execution support including inputting the address stored in said second address storage means to said second port of the data cache memory via said second address means.

6. A device for simultaneous data input and output and execution support in digital processors as recited in claim 1 wherein:
   said means for storing data further comprises:
      a first data storage means for storing said data at an address defined by said first or second address means;
      a second data storage means for storing data outputted from said first means for inputting and outputting data;
      a third data storage means for storing said data from said second data storage means, an output of said third data storage means being a selectable input to said second port of said data cache memory;
   and said means for storing addresses further comprises:
      a first address storage means for storing said address pointers;
      a second address storage means coupled to said first address storage means for storing said addresses from said first address storage means;
   whereby said storage of data from said second data storage means constitutes an intermediate step in said Z delay execution support, the first step including said storage of data outputted from said first means for inputting and outputting data; and said first and second address storage means cooperate to retain during the process of said Z delay execution support the address of said data stored in said second and said third data storage means; the final step in said Z delay execution support including selection of said data stored in said third data storage means and said address stored in said second address storage means for writing to said second port of the data cache memory, it being possible for said writing to be simultaneous with said data input and output at said first port of the data cache memory.

7. The device from claim 1, wherein said data inputted and outputted from said first port of said data cache memory comprises data selected from at least one of said plurality of input/output interfaces, said means for storing data, and an execution unit.

8. The device from claim 1, wherein said data inputted and outputted from said second port of said data cache memory comprises data selected from at least one of said plurality of input/output interfaces and said means for storing data.

9. A device for use with a digital processor for providing data input/output transfers simultaneously with execution support in said digital processor, wherein said execution support includes program execution support for directly transferring data between an external device and an execution unit of a digital processor and Z delay execution support, said device comprising:
   a plurality of input/output interfaces, each of said plurality of input/output interfaces being independently and simultaneously couplable to a different data source, said plurality of input/output interfaces provided a plurality of input/output ports, each of said input/output interfaces being individually controllable, each of said plurality of input/output ports being capable of inputting and/or outputting data simultaneously in time with program execution in said digital processor, said plurality of input/output interfaces including an interface to said execution unit of said digital processor for direct program execution support;
   at least one of said plurality of data input/output interfaces being selected from the group consisting of host central processing unit input and output interfaces, a serial input and output interface, and external memory input and output interfaces;
   a data cache memory, said memory being selectively coupled to said plurality of input/output interfaces and having at least two ports, a first one of said ports being employed only for said data input/output transfers, and a second one of said ports being employed for said data input/output transfers, said direct execution support and said Z delay execution support;
   means comprising a plurality of internal busses for coupling said plurality of input and output interfaces, said data cache memory, and said digital processor, said means for coupling providing for said interfaces, said memory, and said digital processor to receive data directly from or output data directly to any other one of said plurality of input/output interfaces, said memory, or said digital processor;
   said plurality of input/output interfaces, said data cache memory, and said digital processor being directly connected to at least one of said busses;
   means for controlling said plurality of input and output interfaces, said data cache memory, and said digital processor for effecting data transfer between any of said plurality of input/output interfaces, said memory, or said digital processor attached to a first of said plurality of internal busses while simultaneously effecting a transfer between any other of said plurality of input/output interfaces, said memory, or said digital processor which are attached to a second of said plurality of said internal busses, so that data transfer may be effected simultaneously with program execution in said digital processor, said means for controlling comprising means for prioritizing data transfer requests, and said means for controlling operating in the absence of signals originating external to said device.

10. The device as in claim 9, wherein said plurality of data input/output interfaces are selected from the group consisting of host central processing unit input and output interfaces, serial input and output interfaces, external memory input and output interfaces and parallel data input and output interfaces.

11. In a data processor, a novel memory circuit for implementing Z delay operation, said circuit comprising:
   a data cache memory having at least two ports;
   a means for storing Z data;
   a means for storing Z addresses;
   a first address means for inputting addresses into a first port of said cache memory or said means for storing Z addresses from a first source of address pointers;
   a second address means for inputting addresses into a second port of said cache memory from said means for storing Z addresses or a source of external memory addresses;
   a first means for inputting and outputting data from said first port of said cache memory in response to said first address means; and
   a second means for inputting and outputting data from said second port of said cache memory in response to said second address means;
   wherein said first one of said ports outputs an operand for said Z delay operation, and said second one of said ports receives as an input a result of said Z delay operation thereby allowing for the simultaneous calculation of a y(i) filter result based on the formula $y(i) = C(k)*x(i)$, while allowing for the shifting of x(i) samples in memory in preparation of calculating a y(i+1) next result.

12. A novel memory circuit as recited in claim 11 wherein said means for storing Z data further comprises:
   a first data storage means for storing data selected from a group consisting of data inputted and outputted according to said first and said second means for inputting and outputting data, at an address selected from a group consisting of addresses inputted according to said first and second means of inputting addresses;
   a second data storage means for storing data outputted from said first means for inputting and outputting data;
   a third data storage means for storing said data from said second data storage means;
   whereby said storage of data from said second data storage means constitutes a subsequent step in said implementation of said Z delay operation, the first step including said storage of data outputted from said first means for inputting and outputting data.

13. A novel memory circuit as recited in claim 11 wherein said means for storing Z addresses further comprises:
   a first address storage means for storing said address pointers;
   a second address storage means coupled to said first address storage means for storing said addresses from said first address storage means;
   said first and second address means cooperating to retain during said implementation of Z delay operation the address of Z data operated on as part of said Z delay operation.

14. A novel memory circuit as recited in claim 11 wherein:
   said means for storing Z data further comprises:
      a first means for storing data selected from a group consisting of data inputted and outputted according to said first and said second means for inputting and outputting data, at an address selected from a group consisting of addresses inputted according to said first and second means of inputting addresses;
      a second data storage means for storing data outputted from said first means for inputting and outputting data;
      a third data storage means for storing said data from said second data storage means, an output of said third data storage means being a selectable input to said second port of said data cache memory;
   and said means for storing Z addresses further comprises:
      a first address storage means for storing said address pointers;
      a second address storage means coupled to said first address storage means for storing said addresses from said first address storage means;
   wherein said second and third data storage means provide a delay for said Z data, and said first and second address storage means provide said delay for Z addresses, the final step of said Z delay execution support including writing said delayed Z data and Z addresses to said second port of the data cache memory.

15. A device for simultaneous data input and output and execution support in digital processors, wherein said execution support includes program execution support and Z delay execution support, said device comprising:
   a plurality of input/output interfaces for providing a plurality of controllable input/output ports for inputting and outputting data, each of said plurality of input/output interfaces being individually controllable and operable without control signals from sources external to said device;
   a plurality of internal busses;
   a data cache memory selectively couplable to each of said plurality of input/output interfaces via at least one of said plurality of busses, said data cache memory further comprising:
      at least two ports, a first one of said ports being employed for said data input and output, and a second one of said ports being employed for said data input and output and said execution support;
      a means for storing data;
      a means for storing addresses;
      a first address means for inputting addresses into said first port of said data cache memory or said means for storing addresses from a first source of address pointers;
      a second address means for inputting addresses into said second port of said data cache memory from said means for storing addresses or a source of external memory addresses;

one of said busses comprising a first means for inputting and outputting data from said first port of said data cache memory; and another of said busses comprising a second means for inputting and outputting data from said second port of said data cache memory;

and a means for controlling said plurality of input/output interfaces and said data cache memory for effecting a transfer of said data between any of said plurality of input/output devices or said data cache memory;

whereby data transfer is via at least one of said plurality of internal busses and is effected simultaneously with program execution in a digital processor;

said means for storing data further comprising:

a first data storage means for storing said data at an address defined by said first or second address means;

a second data storage means for storing data outputted from said first means for inputting and outputting data;

a third data storage means for storing said data from said second data storage means, an output of said third data storage means being a selectable input to said second port of the data cache memory;

and said means for storing addresses further comprising:

a first address storage means for storing said address pointers;

a second address storage means coupled to said first address storage means for storing said addresses from said first address storage means;

whereby said storage of data from said second data storage means constitutes an intermediate step in said Z delay execution support, the first step including said storage of data outputted from said first means for inputting and outputting data; and said first and second address storage means cooperate to retain during the process of said Z delay execution support the address of said data stored in said second and said third data storage means; the final step in said Z delay execution support including selection of said data stored in said third data storage means and said address stored in said second address storage means for writing to said second port of the data cache memory, it being possible for said writing to be simultaneous with said data input and output at said first port of the data cache memory.

16. The device from claim 15, wherein said data inputted and outputted from said first port of said data cache memory comprises data selected from at least one of said plurality of input/output interfaces, said means for storing data, and an execution unit.

17. The device from claim 1, wherein said data inputted and outputted from said second port of said data cache memory comprises data selected from at least one of said plurality of input/output interfaces and said means for storing data.

* * * * *